(12) United States Patent
Kato

(10) Patent No.: US 7,309,162 B2
(45) Date of Patent: Dec. 18, 2007

(54) LINEAR GUIDE

(75) Inventor: Soichiro Kato, Kanagawa (JP)

(73) Assignee: NSK Ltd., Tokyo (JP)

( * ) Notice: Subject to any disclaimer, the term of this patent is extended or adjusted under 35 U.S.C. 154(b) by 139 days.

(21) Appl. No.: 11/179,803

(22) Filed: Jul. 13, 2005

(65) Prior Publication Data

US 2006/0013517 A1   Jan. 19, 2006

(30) Foreign Application Priority Data

Jul. 14, 2004   (JP) .......................... P.2004-207173

(51) Int. Cl.
*F16C 29/06* (2006.01)
(52) U.S. Cl. ...................................................... 384/45
(58) Field of Classification Search ................. 384/45, 384/44, 43; 464/168
See application file for complete search history.

(56) References Cited

FOREIGN PATENT DOCUMENTS

JP   40-24405 B   10/1965
JP   2000-213538 A   8/2000

*Primary Examiner*—Marcus Charles
(74) *Attorney, Agent, or Firm*—Sughrue Mion Pllc.

(57) ABSTRACT

In a linear guide, a separator is interposed between each pair of adjacent balls. The separator has a separator main body interposed between the adjacent balls, and arm portions provided at end portions of the separator main body, which are arranged in the direction of width of each of rolling element rolling grooves for rolling the balls. The separator also has a guide groove which guides the arm portions of the separator along a circulating direction of the balls when the balls circulate along a passage formed by the first and second rolling element rolling grooves, a direction changing passage, and a rolling element passage.

7 Claims, 6 Drawing Sheets

FIG. 1
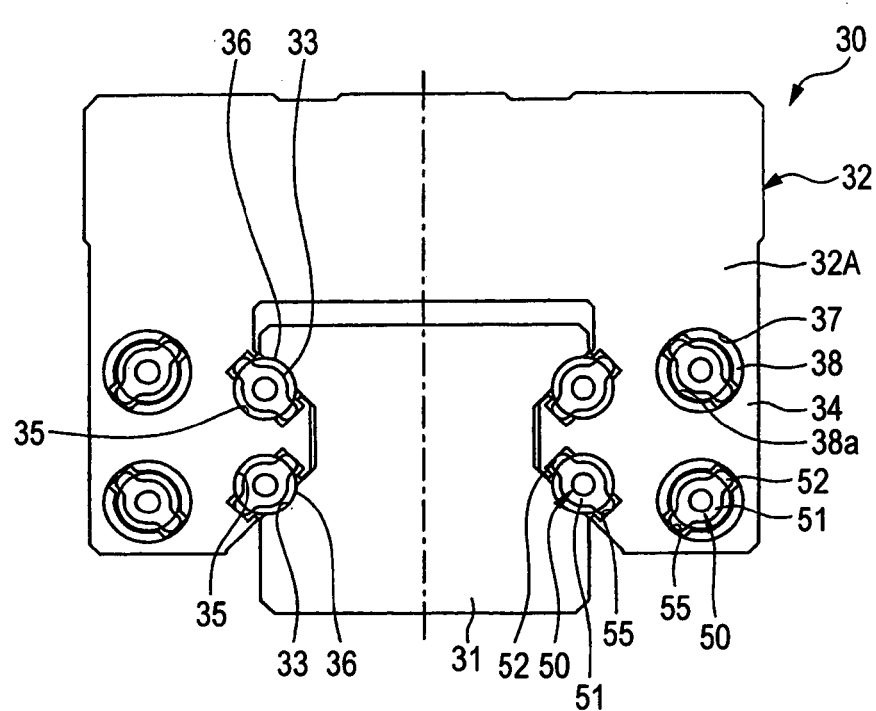
FIG. 2C
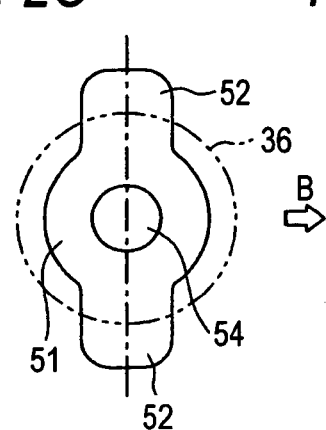
FIG. 2B
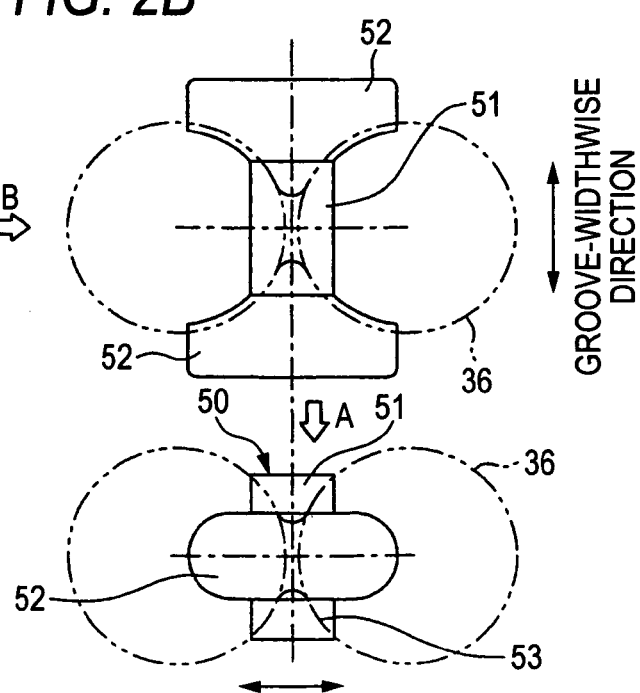
FIG. 2A

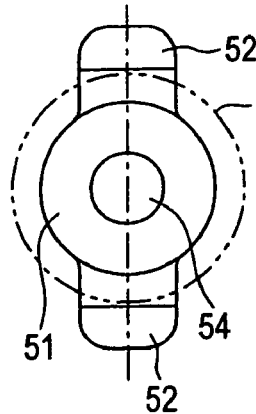
FIG. 3C
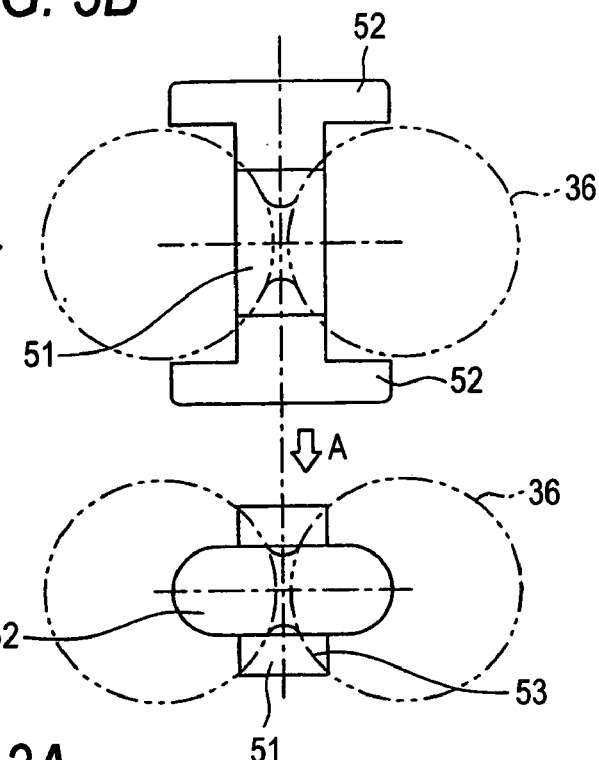
FIG. 3B
FIG. 3A
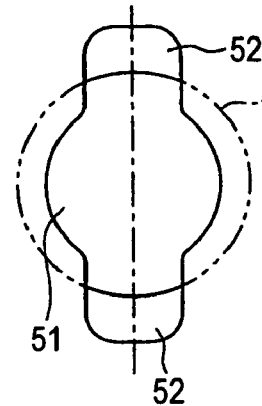
FIG. 4C
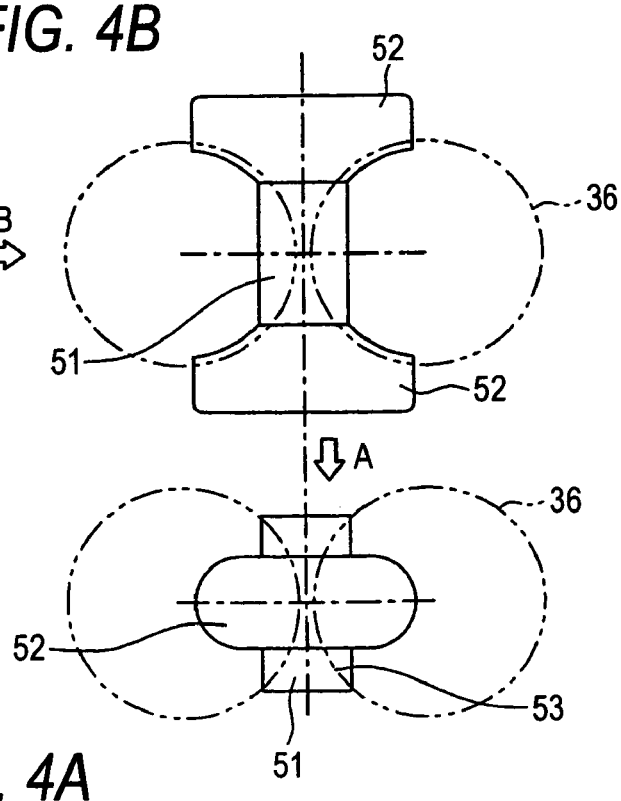
FIG. 4B
FIG. 4A

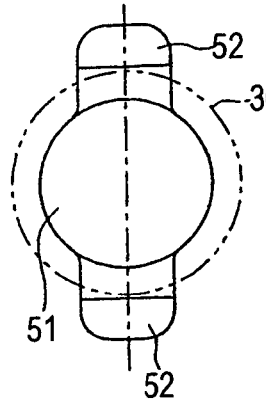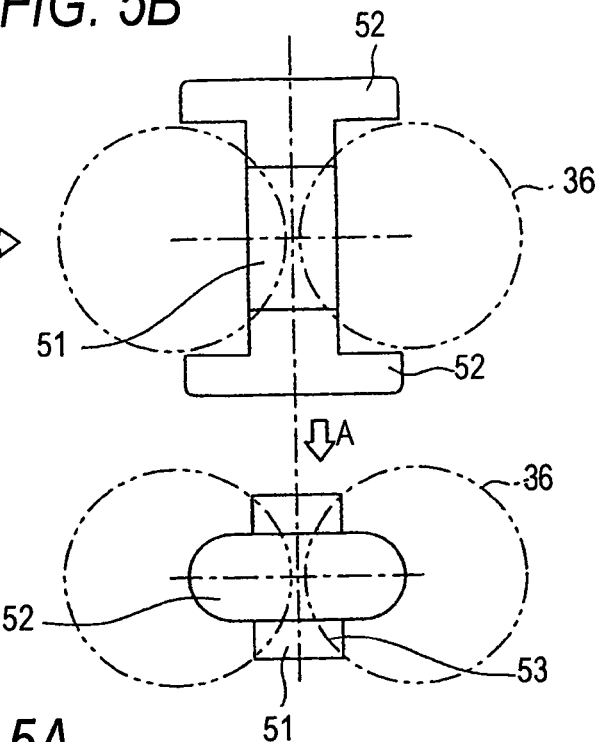
FIG. 5C   FIG. 5B
FIG. 5A
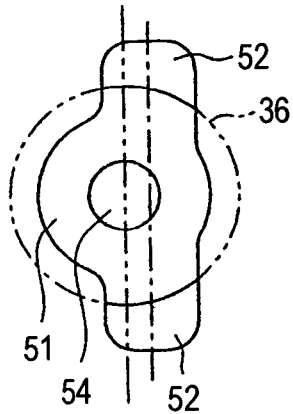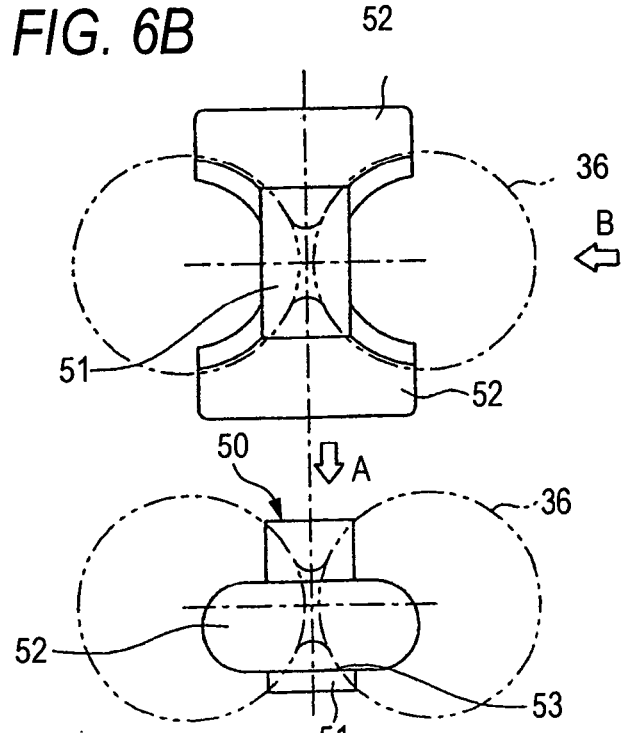
FIG. 6C   FIG. 6B
FIG. 6A

CLEARANCE VARIATION/
MINIMUM VALUE

CLEARANCE VARIATION/
MAXIMUM VALUE

LINEAR GUIDE

CROSS-REFERENCE TO RELATED APPLICATIONS

This application is based upon and claims the benefit of priority from the prior Japanese Patent Applications No. 2004-207173, filed on Jul. 14, 2004, the entire contents of which are incorporated herein by reference.

BACKGROUND OF THE INVENTION

1. Field of the Invention

The present invention relates to a linear guide used in the field of, for example, industrial machines, such as machine tools and injection molders.

2. Description of the Related Art

For instance, an apparatus shown in FIG. 7 is known as a related linear guide.

This linear guide has a guide rail 1 extending in an axial direction, and a slider 2 laid across the guide rail 1 so as to relatively move on the guide rail 1 in the axial direction.

Rolling element rolling grooves 3 extending in the axial direction are formed on each of both side surfaces of the guide rail 1. Rolling element rolling grooves 7 respectively opposed to the rolling element rolling grooves 3 are formed on each of the inner side surfaces of both sleeve portions 4 of the slider main body 2A of the slider 2. Many balls B as one example of rolling elements are rotatably ъmounted between these opposed rolling element rolling grooves 3 and 7. The slider 2 can be relatively moved along the axial direction on the guide rail 1 through the rolling movements of the balls B.

As this movement of the slider 2 is made, the balls B interposing between the guide rail 1 and the slider 2 roll and axially cove to an end portion of the slider 2. However, it is necessary to indefinitely circulate the balls B so as to continuously move the slider 2 in the axial direction.

Thus, a rolling element passage 7 axially extending through the interior of the sleeve portions 4 of the slider main body 2A is formed. For example, an end caps 5 approximately formed in a U-shaped is fixed to each both ends of the slider main body 2A through a fixing means such as a screws 12, etc. A direction changing passage 10 curved in an semi-arc and shape and communicating the rolling element passage 8 and each of a portion between both the above rolling element rolling grooves 3 and 7 is formed in each of the end caps 5. Thus, a rolling element endlessly-circulating raceway is formed. Incidentally, in FIG. 7, reference numeral 11 designates a side seal fixed to an end surface of the slider main body 2A together with the end cap 5 through a screw 12. Reference numeral 10 denotes a tap hole formed in an end surface of the slider main body 2A and adapted so that a screw 12 is screwed thereinto. Reference numeral 13 designates a grease nipple. Reference numeral 14 denotes a bolt insertion hole used for fixing the guide rail 1.

Also, there has been proposed an apparatus configured so that a separator 20 is interposed between adjacent balls B, as shown in FIG. 8, so as to prevent the balls, which endlessly circulate, from being in contact with each other and as to improve operability by applying an appropriate compressing force to rows of balls, and so that a predetermined clearance is provided between one of balls B of one row, which endlessly circulate, and a separator 20 (See, for example, JP-A-2000-213538).

The separator 20 is made of a material, which excels in injection-moldability and wear-proof, for example, "66 nylon" and is shaped like a short cylinder. A concave surface 21 having a curvature radius corresponding to the absolute value of the curvature radius of an outer peripheral surface of the ball B is provided in each of both end surfaces of the separator 20.

Meanwhile, as can be understood from FIGS. 8A and 8B, the dimension of the clearance provided between the ball B, which endlessly circulates, and the separator 20 varies according to the phase of the ball B. In the apparatus disclosed in JP-A-2000-213538, the short-cylindrical separator 20 is only interposed between the balls B. The orbital motion of the separator 20 in the load raceway, the direction changing passage 6 and the rolling element passage 8 in the slider 2 is supported only by the balls B. Thus, in a case where the dimension of the clearance is too large, the separator 20 itself does not have self-sustainability (or attitude stability). Consequently, the separator 20 may be toppled in the arc-like direction changing passage 6, as shown in FIG. 9. In this case, the orbital motion of the separator 20 together with the balls B is disturbed, so that poor circulation is caused. Thus, components of the direction changing passage 6 formed of a resin may be damaged. Consequently, it is necessary to adjust the clearance dimension in units of 0.1 mm so as to prevent the separator 20 from being toppled.

This causes the necessity for preparing a plurality of separators 20, which differ in axial dimension from one another, and for fabricating the apparatus by replacing the separators 20 several by several separators, which differ in dimension from one another, to thereby adjust the clearance dimension. Consequently, it takes time to fabricate the related apparatus, and the cost thereof is high.

SUMMARY OF THE INVENTION

An object of the invention is to provide a linear guide enabled to reduce noises, to improve operability, to considerably decrease time needed for fabrication thereof, and to reduce the cost thereof by preventing toppling of separators to thereby ensure stable orbital motions of the separators and the balls.

The invention provides a linear guide, comprising: a guide rail which has a first rolling element rolling groove extending in an axial direction; a slider which has a second rolling element rolling groove opposed to the first rolling element rolling groove of the guide rail and is laid across the guide rail so as to relatively move along the axial direction through rolling movements of a plurality of balls disposed between the first rolling element rolling groove and the second rolling element rolling groove; and a separator which is interposed between the balls which are adjacent to each other, wherein the slider has: a slider main body which has a rolling element passage extending through the slider main body in the axial direction; and an end cap which has a direction changing passage in a curved shape for communicating the rolling element passage and a passage formed by the first and second rolling element rolling grooves, and is fixed to an axial end portion of the slider main body, and the separator has: a separator main body which is interposed between the balls which are adjacent to each other; arm portions which are integrally provided at end portions of the separator main body in a groove-widthwise direction of the rolling element rolling grooves; and a guide groove which guides the arm portions of the separator along a circulating direction of the balls when the balls circulate along the passage formed by the first and second rolling element rolling grooves, the direction changing passage and the rolling element passage.

In the linear guide, an end portion facing toward the circulating direction of each of the arm portions is formed in an R-shape.

In the linear guide, the end portion facing toward the circulating direction of each of the arm portions is formed in a tapered shape, in which the end portion is shaped more tapered in a direction to a tip of the end portion.

In the linear guide, inner surfaces facing the ball of the arm portion are concave spherical surfaces along an outer peripheral surface of the balls.

In the linear guide, at least one of inner surface of the arm portion is flat.

In the linear guide, the arm portions are provided on both sides of the separator main body at a central position of a concave surface as an inner surface facing the ball of the arm portions.

In the linear guide, the arm portions are provided on both sides of the separator main body at a position where is offset from a center of a center of a concave surface as an inner surface facing the ball of the arm portions.

According to the linear guide, the separator has a separator main body interposed between the balls which are adjacent to each other, the arm portions integrally provided at end portions of the separator main body in a groove-widthwise direction of the rolling element rolling grooves, and a guide groove guiding the arm portions of the separator along a circulating direction of the balls when the balls circulate along the passage formed by the first and second rolling element rolling grooves, the direction changing passage and the rolling element passage. Thus, the separator itself can have self-sustainability (or attitude stability). Consequently, even when the dimension of the clearance provided between the one row of the balls, which are indefinitely circulated, and the row of the separators is somewhat large, the toppling of the separator can be prevented, so that the stable orbital motion of the separator together with the ball can be ensured. As a result, the noises can be reduced. Also, the operability can be enhanced.

Further, it is possible to eliminate the necessity for adjustment of the clearance dimension, which is needed by the related apparatus, by replacing the separators several by several separators, which differ from one another in axial dimension. Thus, since time required to fabricate the apparatus is considerably reduced, the cost thereof can be reduced.

Also, the separator can be prevented from being brought into contact with a step-like part produced in the connection part between the direction changing passage and the load raceway. Thus, the separator can be prevented from being damaged. Consequently, more favorable operability can be obtained.

BRIEF DESCRIPTION OF THE DRAWINGS

FIG. 1 is a view illustrating a state of a linear guide that is an embodiment of the invention, in which an end cap is removed therefrom;

FIGS. 2A to 2C are views illustrating a separator, in which FIG. 2A is a view illustrating the separator seen from a direction of width of a rolling element rolling groove for rolling balls, FIG. 2B is a view seen from a direction of an arrow A shown in FIG. 2A, and FIG. 2C is a view seen from a direction of an arrow B shown in FIG. 2A;

FIGS. 3A to 3C are views illustrating a modification of the separator, in which FIG. 3A is a view illustrating the separator seen from a direction of width of a rolling element rolling groove for rolling balls, FIG. 3B is a view seen from a direction of an arrow A shown in FIG. 3A, and FIG. 3C is a view seen from a direction of an arrow B shown in FIG. 3A;

FIGS. 4A to 4C are views illustrating a modification of the separator, in which FIG. 4A is a view illustrating the separator seen from a direction of width of a rolling element rolling groove for rolling balls, FIG. 4B is a view seen from a direction of an arrow A shown in FIG. 4A, and FIG. 4C is a view seen from a direction of an arrow B shown in FIG. 4A;

FIGS. 5A to 5C are views illustrating a modification of the separator, in which FIG. 5A is a view illustrating the separator seen from a direction of width of a rolling element rolling groove for rolling balls, FIG. 5B is a view seen from a direction of an arrow A shown in FIG. 5A, and FIG. 5C is a view seen from a direction of an arrow B shown in FIG. 5A;

FIGS. 6A to 6C are views illustrating a modification of the separator, in which FIG. 6A is a view illustrating the separator seen from a direction of width of a rolling element rolling groove for rolling balls, FIG. 6B is a view seen from a direction of an arrow A shown in FIG. 6A, and FIG. 6C is a view seen from a direction of an arrow B shown in FIG. 6A;

DETAILED DESCRIPTION OF THE PREFERRED EMBODIMENTS

Figure 7:
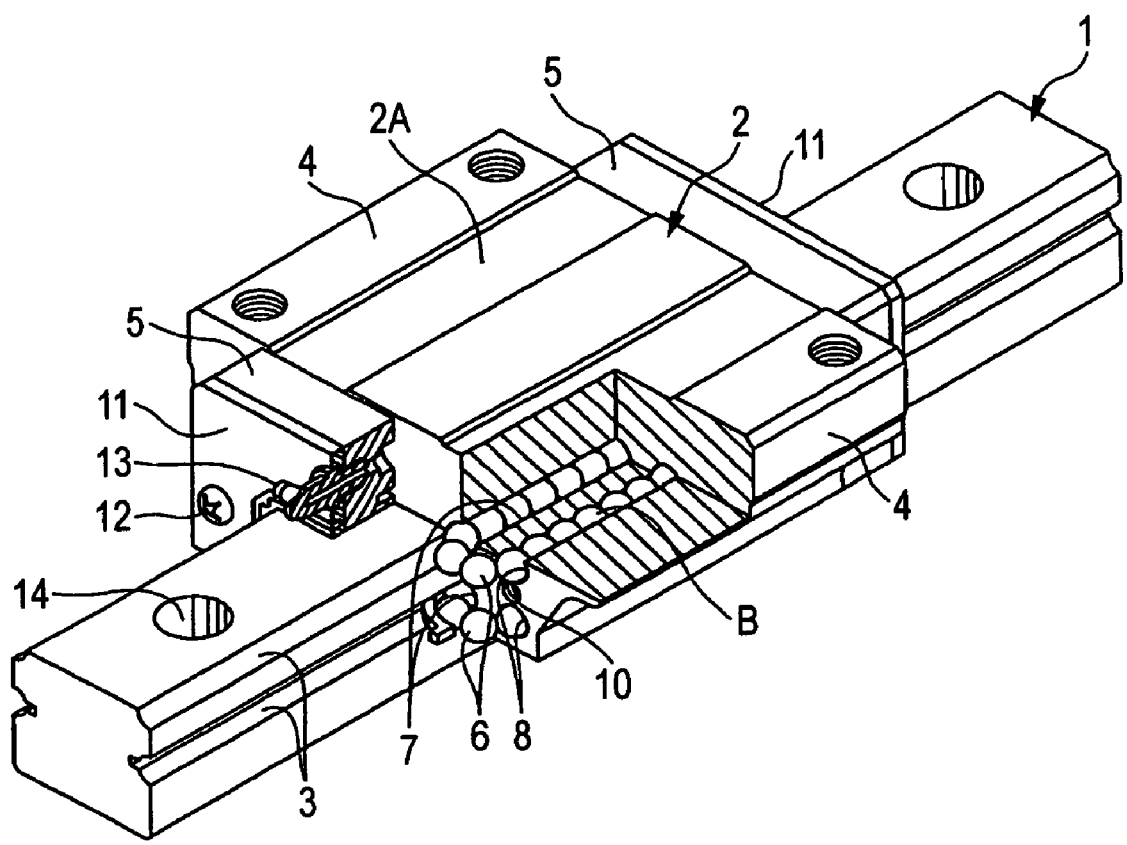
FIG. 7 is a partially cutaway perspective view illustrating a related linear guide.
Figure 8A:
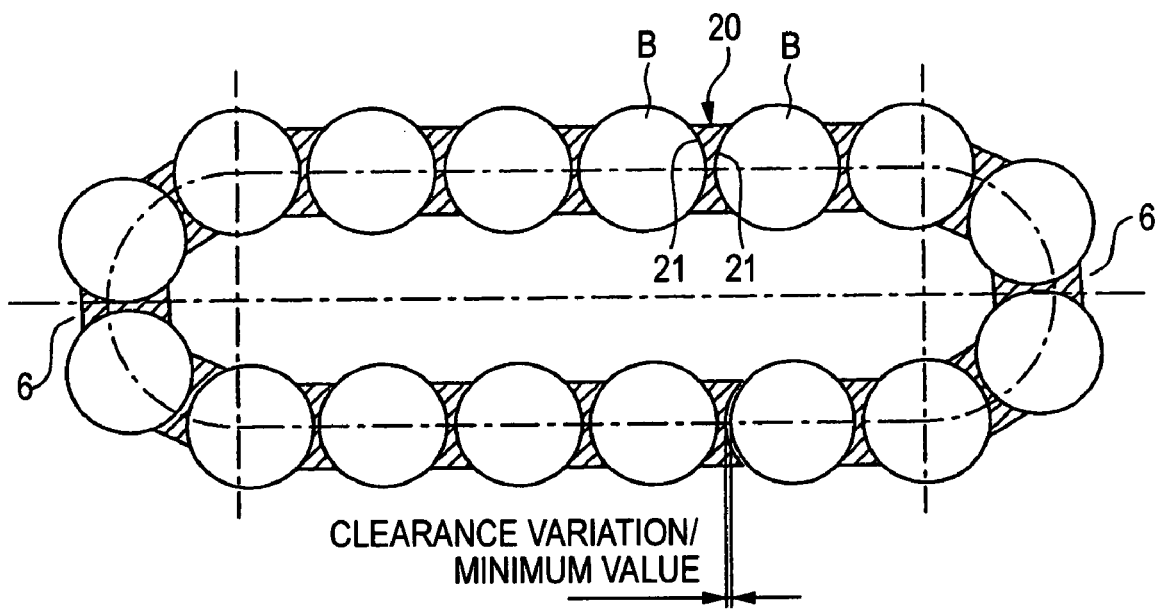
FIG. 8A is an explanatory view illustrating a phase position of a ball, at which the dimension of a clearance provided between the ball and a separator in a rolling element endlessly-circulating raceway has a minimum value.
Figure 8B:
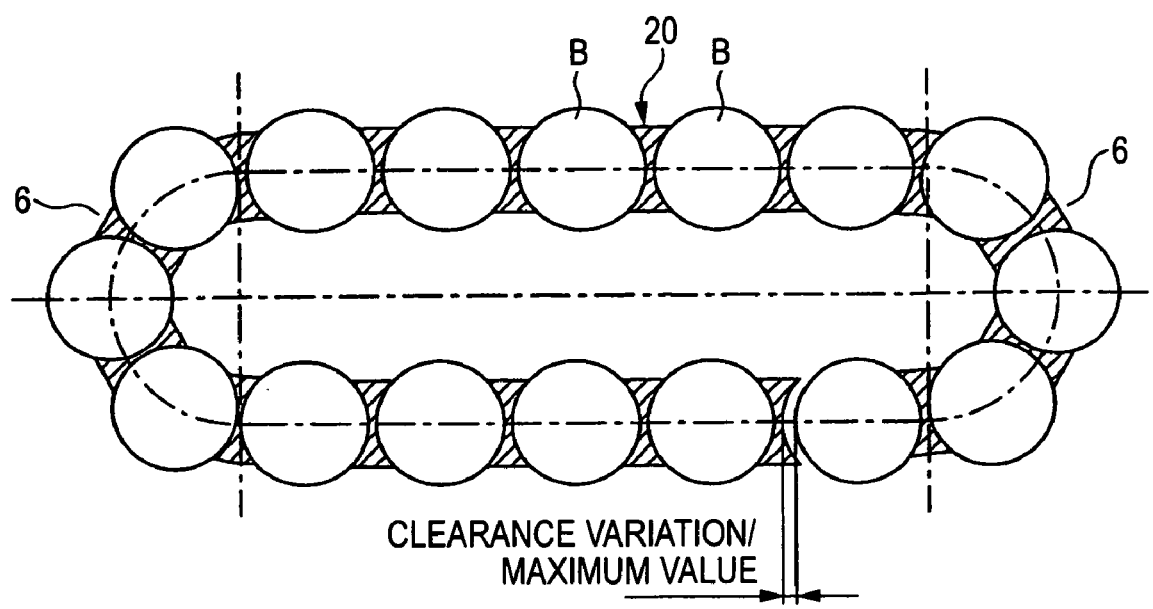
FIG. 8B is an explanatory view illustrating a phase position of the ball, at which the dimension of the clearance provided between the ball and the separator in the rolling element endlessly-circulating raceway has a maximum value.
Figure 9:
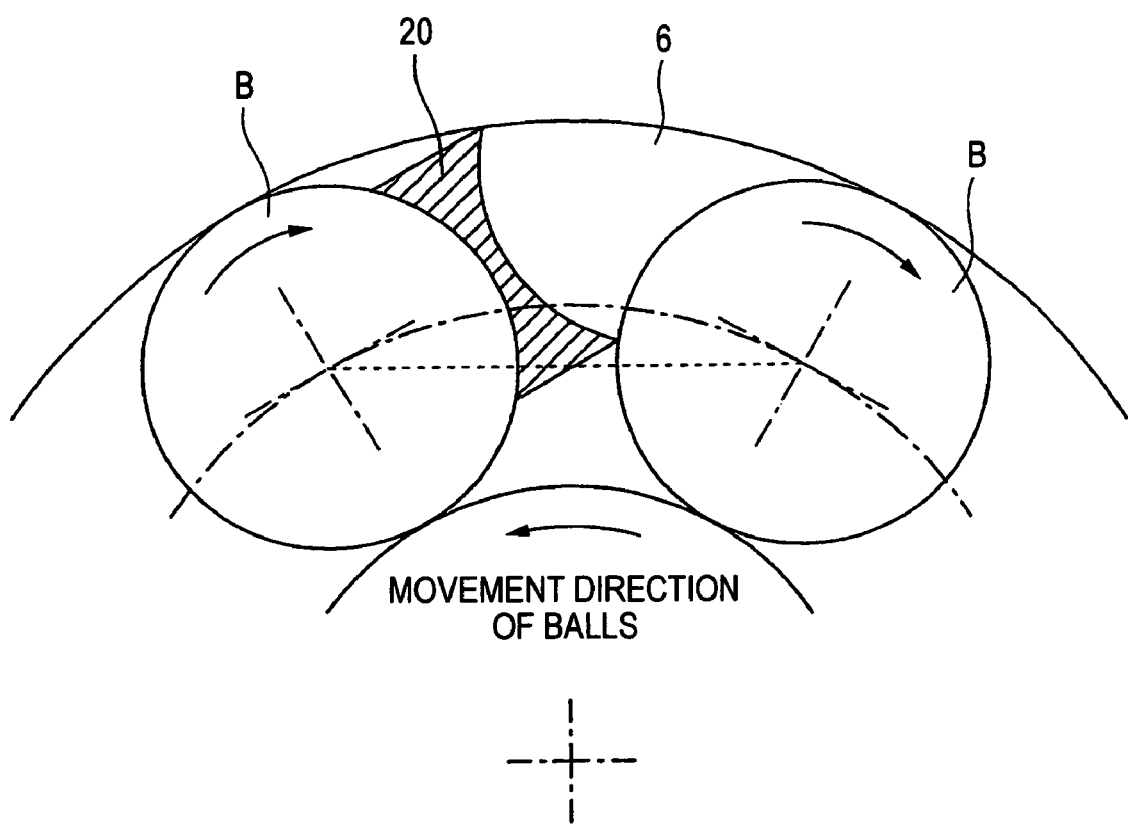
FIG. 9 is an explanatory view illustrating a problem caused when the dimension of the clearance provided between the ball and the separator is too large.

Hereinafter, an embodiment of the invention is described with reference to the accompanying drawings. FIG. 1 is a view illustrating a state of a linear guide that is an embodiment of the invention, in which an end cap is removed therefrom. FIGS. 2A to 2C are views illustrating a separator. FIG. 2A is a view illustrating the separator seen from a direction of width of a rolling element rolling groove for rolling balls. FIG. 2B is a view seen from a direction of an arrow A shown in FIG. 2A. FIG. 2C is a view seen from a direction of an arrow B shown in FIG. 2A.

FIGS. 3A to 6C are views illustrating modifications of the separator.

As shown in FIG. 1, a linear guide 30, which is an embodiment of the invention, has a guide rail 31 which extends in an axial direction, and a slider 32 which is laid across the guide rail 31 so as to relatively move on the guide rail 31 the axial direction.

Two upper and lower rows of rolling element rolling grooves 33 extending in the axial direction are formed on each of both widthwise side surfaces of the guide rail 31, so that a total of four rolling element rolling grooves 33 are formed. Two upper and lower rows of rolling element rolling grooves 35 respectively opposed to the rolling element rolling grooves 33 are formed in the inner side surfaces of both sleeve portions 34 of the slider main body 32A of the slider 32, so that a total of four rolling element rolling grooves 35 are formed.

Many balls 36 serving as rolling elements are rotatably interposed between the rolling element rolling grooves 33 and 35. Rolling movements of the balls 36 enables the slider 32 to relatively move on the guide rail 31 in the axial direction with respect thereto.

Thus, two upper and lower cylindrical holes 37 axially extending through the sleeve portions 34 of the slider main body 32A, that is, a total of the four holes 37 are formed on one of sides thereof. Circulating sleeves 38, in which the inside of each of the circulating sleeves 38 is used as a passage (a rolling element passage) 38a for the balls 36, are fitted into these holes 37. Also, end caps (not shown) are respectively fixed to both axial ends of the slider main body 32A by screws. A direction changing passage (not shown) curved like an arc and adapted to communicate between the load raceway, which is provided between the rolling element rolling grooves 33 and 35, and the rolling element passage 38a is formed in each of the end caps. Thus, an endless raceway for the balls 36 is formed.

In the embodiment, the direction changing passage communicating between the upper rolling element passage 38a and each of both the lower rolling element rolling grooves 33 and 35 is disposed to cross the direction changing passage, which communicates between the lower rolling element passage 38a and each of both the upper rolling element rolling grooves 33 and 35, in a grade separation manner.

In the embodiment, as shown in FIGS. 1 and 2A to 2C, a separator 50 is interposed between each pair of adjacent balls 36 in the rolling element endlessly-circulating raceway. The separator 50 is formed of a material, which excels in injection-moldability and wear-proof, for example, polyamide (for instance, "6 nylon", "46 nylon" and "66 nylon") or an elastomer (for instance, Hytrel or Pelprene). The separator 50 has a short-cylinder-like separator main body 51 interposed between the balls 36 which are adjacent to each other and arm portions 52 which are integrally provided at both end portions of the separator main body 51 in a groove-widthwise direction of the rolling element rolling grooves 33 and 35, respectively, and are disposed to pinch both sides of the ball 36.

A concave surface 53 having a curvature radius, which is slightly larger than the radius of the ball, is provided in each of both axial end surfaces of the separator main body 51. An inside-diameter portion of the separator main body 51 is opened in the central part of the concave surface 53 and is used as an oil basin 54.

When the balls 36 are circulated in the load raceway, which is provided between both the rolling element rolling grooves 33 and 35, the direction changing passage and the rolling element passage 38a, the arm portions 52 of the separator 50 are guided by a guide groove 55 (see FIG. 1) along the direction, in which the balls 36 are circulated.

In this case, it is preferable to form the end portion facing toward a circulating direction of the arm portion 52 in an R-shape so as to enable the arm portions 52 of the separator 50 to smoothly circulate along the guide groove 55. More preferably, the end portion facing toward the circulating direction of the arm portion 52 is formed in a tapered shape, in which the end portion is shaped more tapered in a direction to a tip of the end portion.

Thus, in the embodiment, the short-cylinder-like separator 50 has the separator main body 51, which is interposed between the adjacent balls 36, and the arm portions 52 integrally provided at both widthwise end portions of each of the rolling element rolling grooves 33 and 35 of the separator main body 51. The separator 50 is provided with the guide groove 55 to guide the arm portion 52 along the circulating direction of the ball 36. Thus, separator 50 itself can have self-sustainability (or attitude stability).

Consequently, even when the dimension of the clearance provided between the one row of the balls 36, which are endlessly circulated, and the row of the separators 50 is somewhat large, the toppling of the separator 50 can be prevented, so that the stable orbital motion of the separator 50 together with the ball 36 can be ensured. As a result, the noises can be reduced. Also, the operability can be enhanced.

It is unnecessary to adjust the clearance dimension, which is needed by the related apparatus, by replacing the separators several by several separators, which differ from one another in axial dimension. Thus, since time required to fabricate the apparatus is considerably reduced, the cost can be reduced.

Also, the separator 50 can be prevented from being brought into contact with a step-like part produced in the connection part between the direction changing passage and the load raceway. Thus, the separator 50 can be prevented from being damaged. Consequently, more favorable operability can be obtained.

The linear guide of the invention is not limited to the aforementioned embodiment. The embodiment can appropriately be altered without departing from the spirit and scope of the invention.

For example, although the inner surface of the arm portion 52, which faces the ball 52, is set to be a concave spherical surface along the outer peripheral surface of the ball 52 in the aforementioned embodiment, instead, the inner surface of the arm portion 52 may be set to be flat as shown in FIGS. 3A to 3C.

Although the separator 51 is shaped like a short cylinder in the aforementioned embodiment, the shape of the separator 51 according to the invention is not limited thereto. As shown in FIGS. 4A to 5C, the separator 51 may be shaped like a short cylindrical column. In this case, a concave groove or a depot may be formed in the concave surface 53 of the separator main body 51 and also may be used as an oil basin.

Although the foregoing description of the embodiment has described an example in which the arm portions 52 provided on both sides of the separator main body 51 face each other at the central position of the concave surface 53, the arm portions 52 provided on both sides of the separator main body 51 may face each other at a position where is offset from the center of the concave surface 53.

Although the concave surface 53 of the separator main body 51 has a curvature radius set to be slightly larger than the radius of the ball, the shape of the concave surface 53 according to the invention is not limited thereto. The concave surface 53 may be shaped like a circular cone. Alternatively, the curvature radius, which is slightly larger than the radius of the ball, may be optionally changed according to a position with which the ball is put into contact.

Although the foregoing description of the embodiment has described an example in which the concave surface 53 of the separator 51 is shaped like a single arc, instead, the concave surface 53 may be shaped like a Gothic arc or a combination of circular arcs.

What is claimed is:

1. A linear guide, comprising:
   a guide rail which has a first rolling element rolling groove extending in an axial direction;
   a slider which has a second rolling element rolling groove opposed to the first rolling element rolling groove of the guide rail and is laid across the guide rail so as to relatively move along the axial direction through rolling movements of a plurality of balls disposed between the first rolling element rolling groove and the second rolling element rolling groove; and
   a separator which is interposed between the balls which are adjacent to each other,
   wherein the slider has:
   a slider main body which has a rolling element passage extending through the slider main body in the axial direction; and
   an end cap which has a direction changing passage in a curved shape for communicating the rolling element passage and a passage formed by the first and second rolling element rolling grooves, and is fixed to an axial end portion of the slider main body, and
   the separator has:
   a separator main body which is interposed between the balls which are adjacent to each other;
   arm portions which are integrally provided at end portions of the separator main body in a groove-widthwise direction of the rolling element rolling grooves; and
   a guide groove which guides the arm portions of the separator along a circulating direction of the balls when the balls circulate along the passage formed by the first and second rolling element rolling grooves, the direction changing passage and the rolling element passage.

2. The linear guide according to claim 1,
   wherein an end portion facing toward the circulating direction of each of the arm portions is formed in an R-shape.

3. The linear guide according to claim 2,
   wherein the end portion facing toward the circulating direction of each of the arm portions is formed in a tapered shape, in which the end portion is shaped more tapered in a direction to a tip of the end portion.

4. The linear guide according to claim 1,
   wherein inner surfaces facing the ball of the arm portion are concave spherical surfaces along an outer peripheral surface of the balls.

5. The linear guide according to claim 1,
   wherein at least one of inner surface of the arm portion is flat.

6. The linear guide according to claim 1,
   wherein the arm portions are provided on both sides of the separator main body at a central position of a concave surface as an inner surface facing the ball of the arm portions.

7. The linear guide according to claim 1,
   wherein the arm portions are provided on both sides of the separator main body at a position where is offset from a center of a center of a concave surface as an inner surface facing the ball of the arm portions.

* * * * *